United States Patent
Ahmed et al.

(10) Patent No.: US 11,023,409 B2
(45) Date of Patent: Jun. 1, 2021

(54) MIPI D-PHY RECEIVER AUTO RATE DETECTION AND HIGH-SPEED SETTLE TIME CONTROL

(71) Applicant: QUALCOMM Incorporated, San Diego, CA (US)

(72) Inventors: Yasser Ahmed, San Diego, CA (US); Ying Duan, San Diego, CA (US); Shih-Wei Chou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/591,719

(22) Filed: Oct. 3, 2019

(65) Prior Publication Data

US 2021/0103547 A1 Apr. 8, 2021

(51) Int. Cl.
*G06F 13/42* (2006.01)

(52) U.S. Cl.
CPC ...... *G06F 13/4291* (2013.01); *G06F 13/4295* (2013.01); *G06F 13/42* (2013.01)

(58) Field of Classification Search
CPC .............................. G06F 13/42; G06F 13/4291
See application file for complete search history.

(56) References Cited

U.S. PATENT DOCUMENTS

| | | | |
|---|---|---|---|
| 2010/0232304 A1* | 9/2010 | den Besten | G06F 13/4072 370/252 |
| 2018/0321705 A1* | 11/2018 | Koshisaka | G06F 13/42 |
| 2020/0021633 A1* | 1/2020 | Sengoku | G06F 13/4291 |
| 2020/0304281 A1* | 9/2020 | Takahashi | H04L 7/0008 |

* cited by examiner

*Primary Examiner* — Zachary K Huson

(57) ABSTRACT

System, methods and apparatus are described that support multimode operation of a data communication interface. An apparatus includes a physical layer interface coupled to a serial bus and configurable for a high-speed mode of communication and a low-speed mode of communication, and a rate detector configured to receive a clock signal from the serial bus, and to use a reference clock to determine a unit interval representative of a data rate of the serial bus. The apparatus may also include interval calculation logic configured to determine an interval related to timing of a data signal transmitted on the serial bus, the interval having a duration expressed as a number of cycles of the reference clock. The physical layer interface may be configured to use the interval to capture data in the data signal.

30 Claims, 13 Drawing Sheets

MIPI D-PHY RECEIVER AUTO RATE DETECTION AND HIGH-SPEED SETTLE TIME CONTROL

TECHNICAL FIELD

At least one aspect generally relates to data communications interfaces, and more particularly, to optimizing synchronization time in a D-PHY interface operable at multiple clock speeds.

BACKGROUND

Manufacturers of mobile devices, such as cellular phones, may obtain components of the mobile devices from various sources, including different manufacturers. For example, the application processor in a cellular phone may be obtained from a first manufacturer, while the display for the cellular phone may be obtained from a second manufacturer. Moreover, multiple standards are defined for interconnecting certain components of the mobile devices. For example, there are multiple types of interface defined for communications between an application processor and display and camera components of a mobile device. Some components employ an interface that conforms to one or more standards specified by the Mobile Industry Processor Interface (MIPI) Alliance. For example, the MIPI Alliance defines protocols for a camera serial interface (CSI) and a display serial interface (DSI).

The MIPI Alliance CSI-2, DSI and DSI-2 standards define a wired interface that can be deployed within or between integrated circuit (IC) devices and/or System-on-Chip (SoC) devices. The wired interface may be provided to couple a camera and application processor, or an application processor and display. The low-level physical-layer (PHY) interface in each of these applications can be MIPI C-PHY or MIPI D-PHY. High-speed modes and low-power modes of communication are defined for MIPI C-PHY and MIPI D-PHY. The MIPI C-PHY high-speed mode uses a low-voltage multiphase signal transmitted in different phases on a 3-wire link. The MIPI D-PHY high-speed mode uses a plurality of 2-wire lanes to carry low-voltage differential signals. The low-power mode of MIPI C-PHY and MIPI D-PHY provides lower rates than the high-speed mode and transmits signals at higher voltages. The high-speed signals are undetectable by receivers configured for low-power operation.

As device technology improves, a combination of higher data rate and low-power modes may be desired to support applications that require high data rates at certain times but also that have a limited power budget. There is a need to improve interfaces to take advantage of technology improvements.

SUMMARY

Embodiments disclosed herein provide systems, methods and apparatus that enable a receiver coupled to a serial bus to automatically determine data rates and related timing parameters, including when entering high-speed D-PHY modes of communication. According to certain aspects described herein, two or more IC devices may be collocated in an electronic apparatus and communicatively coupled through one or more data links that can be configured with one of a plurality of interface standards.

In an aspect of the disclosure, a method performed in a receiving device includes receiving a clock signal from a serial bus, using a reference clock to determine a unit interval representative of a data rate of the serial bus, determining an interval related to timing of a data signal transmitted on the serial bus, the interval having a duration expressed as a number of cycles of the reference clock, and using the interval to capture data in the data signal. The interval may be calculated as a function of a multiple of the unit interval.

In certain aspects, the interval corresponds to a settle time defined by a D-PHY protocol. The interval may define a capture window used to capture the data in the data signal. The data may be captured from the data signal when a physical layer interface of the receiving device is configured for a high-speed mode of communication defined by D-PHY protocols.

In certain aspects, the clock signal is a high-speed signal received while a physical layer interface of the receiving device is in a low-speed mode of communication defined by D-PHY protocols and before the physical layer interface enters a high-speed mode of communication defined by the D-PHY protocols.

In certain aspects, the method includes identifying a sequence of signaling states of the serial bus that indicates commencement of a high-speed mode of communication defined by D-PHY protocols. The interval may correspond to a settle period that starts while the sequence of signaling states is being received, and a data capture circuit may be enabled before the settle period ends.

In an aspect of the disclosure, an apparatus includes a physical layer interface coupled to a serial bus and configurable for a high-speed mode of communication and a low-speed mode of communication, a rate detector configured to receive a clock signal from the serial bus, and to use a reference clock to determine a unit interval representative of a data rate of the serial bus. The apparatus may also include interval calculation logic configured to determine an interval related to timing of a data signal transmitted on the serial bus, the interval having a duration expressed as a number of cycles of the reference clock. The physical layer interface may be configured to use the interval to capture data in the data signal.

In an aspect of the disclosure, a processor readable storage medium includes code for receiving a clock signal from a serial bus, using a reference clock to determine a unit interval representative of a data rate of the serial bus, determining an interval related to timing of a data signal transmitted on the serial bus, the interval having a duration expressed as a number of cycles of the reference clock, and using the interval to capture data in the data signal.

In an aspect of the disclosure, an apparatus includes means for coupling the apparatus to a serial bus configurable for a high-speed mode of communication and a low-speed mode of communication, means for detecting a data rate of the serial bus, configured to receive a clock signal from the serial bus and use a reference clock to determine a unit interval representative of the data rate, and means for calculating an interval related to timing of a data signal transmitted on the serial bus, the interval having a duration expressed as a number of cycles of the reference clock. The interval may be used to capture data in the data signal.

DETAILED DESCRIPTION

Figure 1:
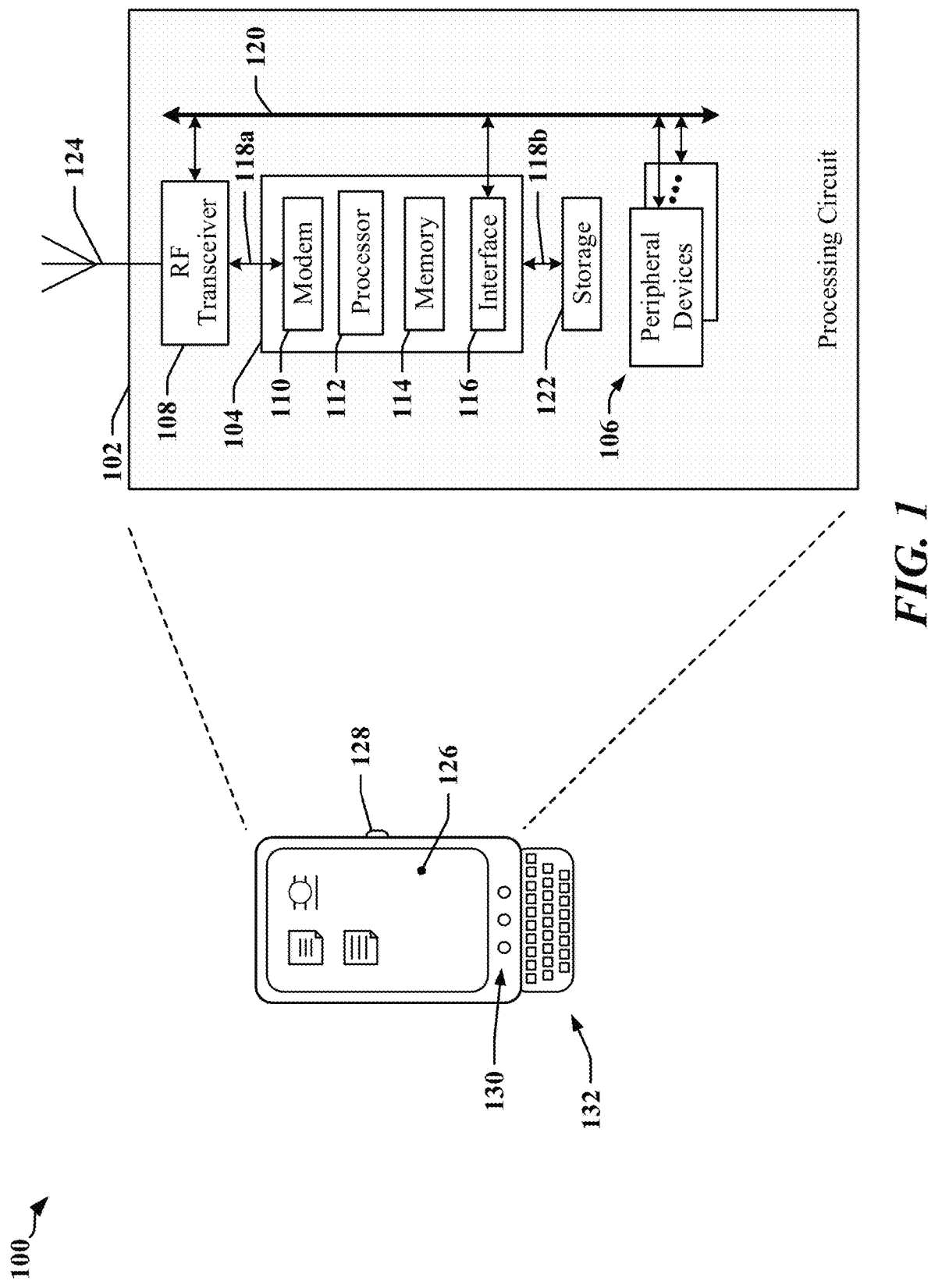
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 illustrates an example of an apparatus 100 that may employ a data communication bus. The apparatus 100 may include a processing circuit 102 having multiple circuits or devices 104, 106 and/or 108, which may be implemented in one or more ASICs or in an SoC. In one example, the apparatus 100 may be provided in a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that may provide an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114 and the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may provide one or more buses 118a, 118b, 120 that enable certain devices 104, 106, and/or 108 to communicate. In one example, the ASIC 104 may include a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
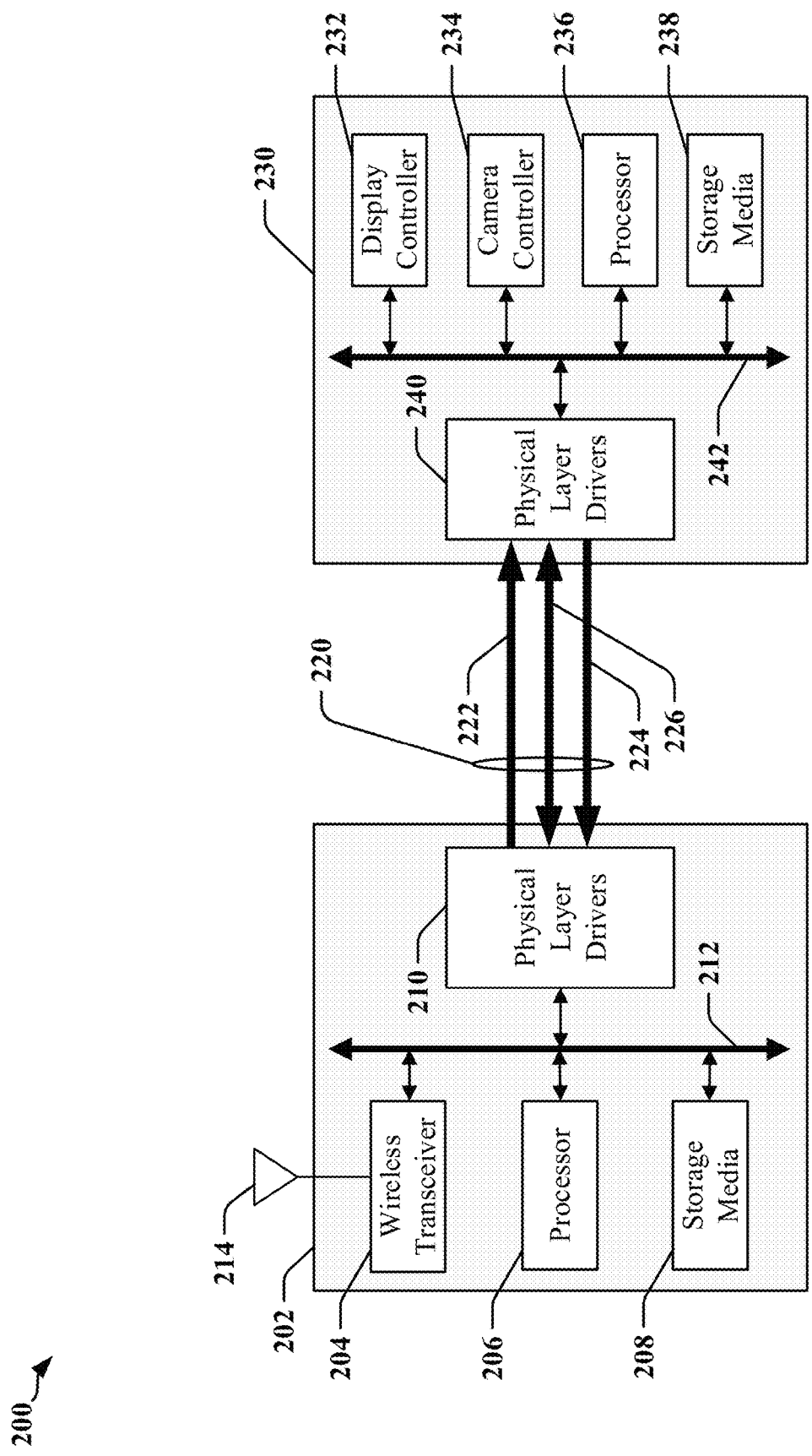
FIG. 2 illustrates a system architecture for an apparatus employing a data link between IC devices.

FIG. 2 illustrates certain aspects of an apparatus 200 such as a mobile communication device that employs a communication link 220 to connect various subcomponents. In one example, the apparatus 200 includes plural IC devices 202 and 230 that exchange data and control information through the communication link 220. In some implementations, the communication link 220 can be used to couple IC devices 202 and 230 that are physically located in close proximity to one another, or in different, distant parts of the apparatus 200. In some implementations, the communication link 220 can be used to couple circuits or components resident in the same IC. In one example, the communication link 220 may be provided on a chip carrier, substrate or circuit board that carries the IC devices 202 and 230. In another example, a first IC device 202 may be located in a keypad section of a mobile computing device while a second IC device 230 may be located in a display section of mobile computing device. In another example, a portion of the communication link 220 may be implemented using a cable or optical connection.

The communication link 220 may provide multiple channels 222, 224, 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In this disclosure, a first channel may be referred to as a forward channel 222 while a second channel may be referred to as a reverse channel 224. The first IC device 202 may be designated as a host device or transmitter, while the second IC device 230 may be designated as a client device or receiver, including when both IC devices 202 and 230 are configured to transmit and receive on a bidirectional channel 226. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each have a processor 206, 236 or other processing and/or computing circuit or device. In one example, the first IC device 202 may perform core functions of the apparatus 200, including maintaining communications through an RF transceiver 204 and an antenna 214, while the second IC device 230 may manage, control or operate a display controller 232 and/or a camera controller 234 associated with a camera or video input device. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse channel 224 may be operated in the same manner as the forward channel 222, and the forward channel 222 and reverse channel 224 may be capable of transmitting at comparable speeds or at different speeds, where speed may be expressed as data rate, data transfer rate and/or clocking rates. The forward and reverse data rates may be substantially the same or may differ by orders of magnitude, depending on the application. In some applications, a single bidirectional channel 226 may support communications between the first IC device 202 and the second IC device 230. The forward channel 222 and/or reverse channel 224 may be configurable to operate in a bidirectional mode when, for example, the forward channel 222 and reverse channel 224 share the same physical connections and operate in a half-duplex manner. In one example, the communication link 220 may be operated to communicate control, command and other information between the first IC device 202 and the second IC device 230 in accordance with industry or other standards.

In one example, the forward channel 222 and/or reverse channel 224 may be configured or adapted to support a wide video graphics array (WVGA) 80 frames per second LCD driver IC without a frame buffer, delivering pixel data at 810 Mbps for display refresh. In another example, the forward channel 222 and/or reverse channel 224 may be configured or adapted to enable communications between dynamic random access memory (DRAM), such as double data rate synchronous dynamic random access memory (SDRAM). The drivers 210, 240 may include encoding devices that can be configured to encode multiple bits per clock transition, and multiple sets of wires can be used to transmit and receive data from the SDRAM, control signals, address signals, and other signals.

The forward channel 222 and/or reverse channel 224 may comply with, or be compatible with application-specific industry standards, including standards defined by the MIPI Alliance. The MIPI Alliance defines standards that include specifications used to govern the operational characteristics of products such as mobile communication devices. In some instances, the MIPI Alliance defines interface standard and protocols applicable to complimentary metal-oxide-semiconductor (CMOS) parallel buses.

Figure 3:
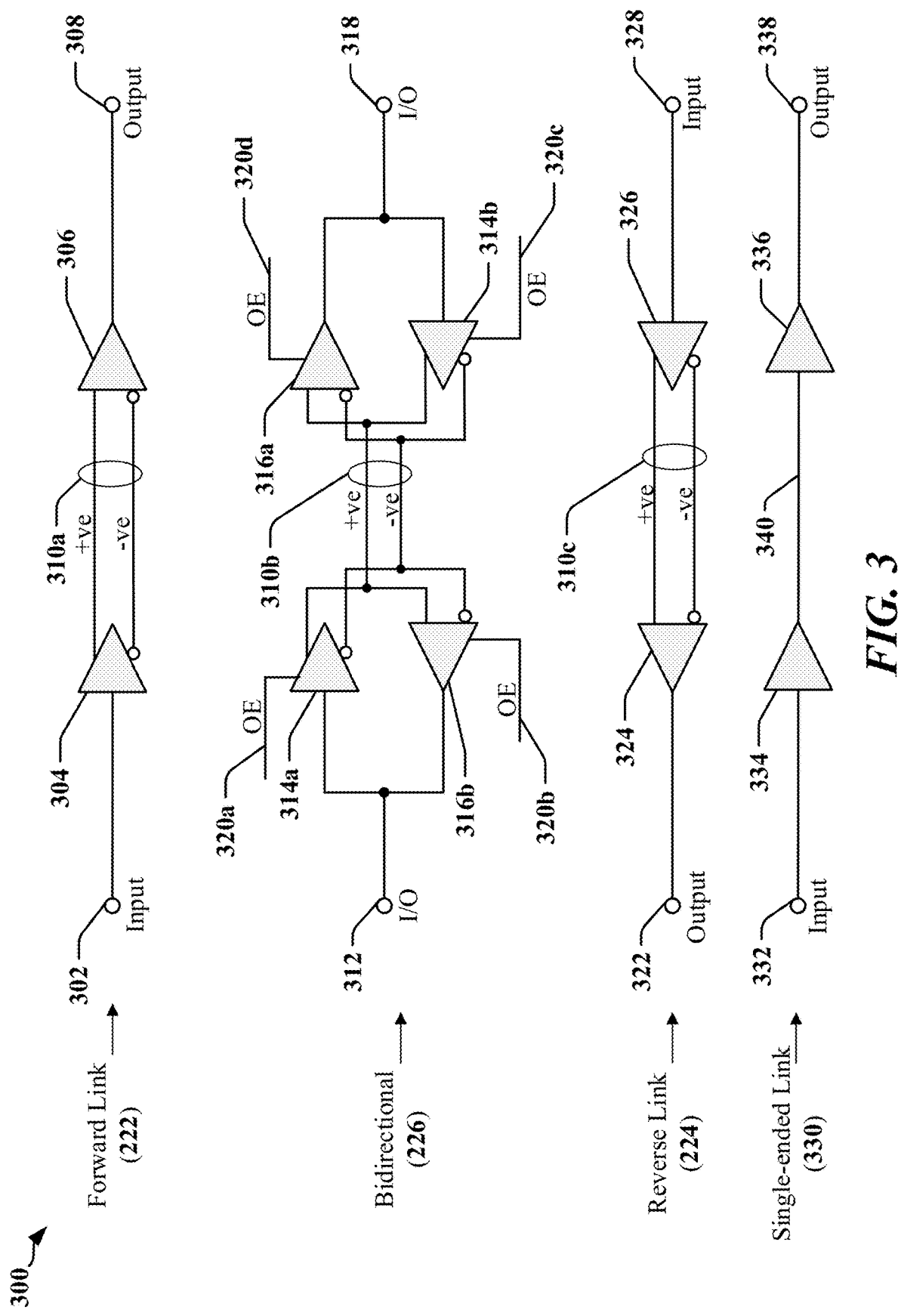
FIG. 3 illustrates certain aspects of a configuration of drivers and receivers in a multilane serial interface.

FIG. 3 illustrates certain aspects of links 300 that include line driving circuits and line receiver circuits that can be configured to support a communication link 220 that can provide a variety of lanes. The communication link 220 may include different types of drivers and/or reconfigurable line driving circuits that can perform in multiple modes of communication. The line driving circuits may include circuits that operate at different voltage levels to support different modes of communication. Differential signaling typically involves transmitting information electrically using two complementary signals sent on a pair of wires 310a, 310b, 310c, which may be referred to as a differential pair. In some instances, the pair of wires 310a, 310b, 310c may be coupled by a termination resistor when operating at high data rates. The termination resistor typically matched the characteristic impedance of the pair of wires 310a, 310b, 310c and can prevent or minimize reflections and other causes of signal noise and distortion. The use of differential pairs can significantly reduce electromagnetic interference (EMI) by canceling the effect of common-mode interference that affects both wires in a differential pair. On the forward channel 222, a pair of wires 310a may be driven by a host differential driver 304. The differential driver 304 receives a binary signal that can encode synchronization and control and/or input data 302 portions. The differential driver 304 generates positive and negative versions of the input data 302, which are then provided to the pair of wires 310a. The differential receiver 306 on the client side generates an output data stream 308 by performing a comparison of the signals carried on the pair of wires 310a.

On the reverse channel 224, one or more pairs of wires 310c may be driven by a client-side differential driver 326. The differential driver 326 receives a binary signal that can encode synchronization and control and/or input data 328 portions. The differential driver 326 generates positive and negative versions of the input data 328, which are provided to the pair of wires 310c. The differential receiver 324 on the host generates an output data stream 322 by performing a comparison of the signals carried on the pair of wires 310c.

In a bidirectional channel 226, the host and client may be configured for half-duplex mode and may transmit and receive data on the same pair of wires 310b. A bidirectional bus may alternatively or additionally be operated in full-duplex mode using combinations of the forward and reverse differential drivers 304, 326 in the host and client to drive and monitor multiple pairs of wires 310a, 310c. In the half-duplex bidirectional implementation depicted for the bidirectional channel 226, the differential drivers 314a and 314b may be prevented from driving the pair of wires 310b simultaneously using, for example, an output-enable (OE) control 320a, 320c (respectively) to force the differential drivers 314a and 314b into a high impedance state. The differential receiver 316b may be prevented from driving the input/output 312 while the differential driver 314a is active, typically using an OE control 320b to force the differential receiver 316b into a high impedance state. The differential receiver 316a may be prevented from driving the input/output 318 while the differential driver 314b is active, typically using an OE control 320d to force the differential receiver 316a into a high impedance state. In some instances, the outputs of the differential drivers 314a and 314b and the differential receivers 316a and 316b may be in a high-impedance state when the interface is not active. Accordingly, the OE control 320a, 320c, 320d and 320b of the differential drivers 314a, 314b, and the differential receivers 316a and 316b may be operated independently of one another.

Each of the differential drivers 304, 314a, 314b and 326 may include a pair of amplifiers, one receiving at one input the inverse of the input of the other amplifier. The differential drivers 304, 314a, 314b and 326 may each receive a single input and may have an internal inverter that generates an inverse input for use with a pair of amplifiers. The differential drivers 304, 314a, 314b and 326 may also be constructed using two separately controlled amplifiers, such that their respective outputs can be placed in high impedance mode independently of one another.

In a single-ended link 330, single-ended line driver 334 and receiver 336 may be used for communications over a single wire 340. In some instances, the input 332 and output 338 of the single-ended link 330 may be bidirectional, and both transmitting and receiving devices may employ a transceiver that includes both a line driver 334 and a receiver 336 that is controlled in accordance with one or more protocols.

The D-PHY Interface

The MIPI Alliance defines standards and specifications that may address communications affecting all aspects of operations in a mobile device, including the antenna, peripherals, the modem and application processors. For example, the MIPI Alliance defines protocols for a camera serial interface (the CSI) and a display serial interface (the DSI). The CSI-2 defines a wired interface between a camera and Application Processor and the DSI or DSI-2 defines a wired interface between an Application Processor and a display. The low-level physical layer (PHY) interface in each of these applications can be operated in accordance with D-PHY protocols.

According to certain aspects disclosed herein, systems and apparatus may employ some combination of differential and single-ended encoding for communicating between IC devices. In one example, D-PHY technology may be used to connect camera or display devices to an application processor. A D-PHY interface can switch between a differential (High-speed) mode and a (Low Power) mode in real time as needed to facilitate the transfer of large amounts of data or to conserve power and prolong battery life.

Figure 4:
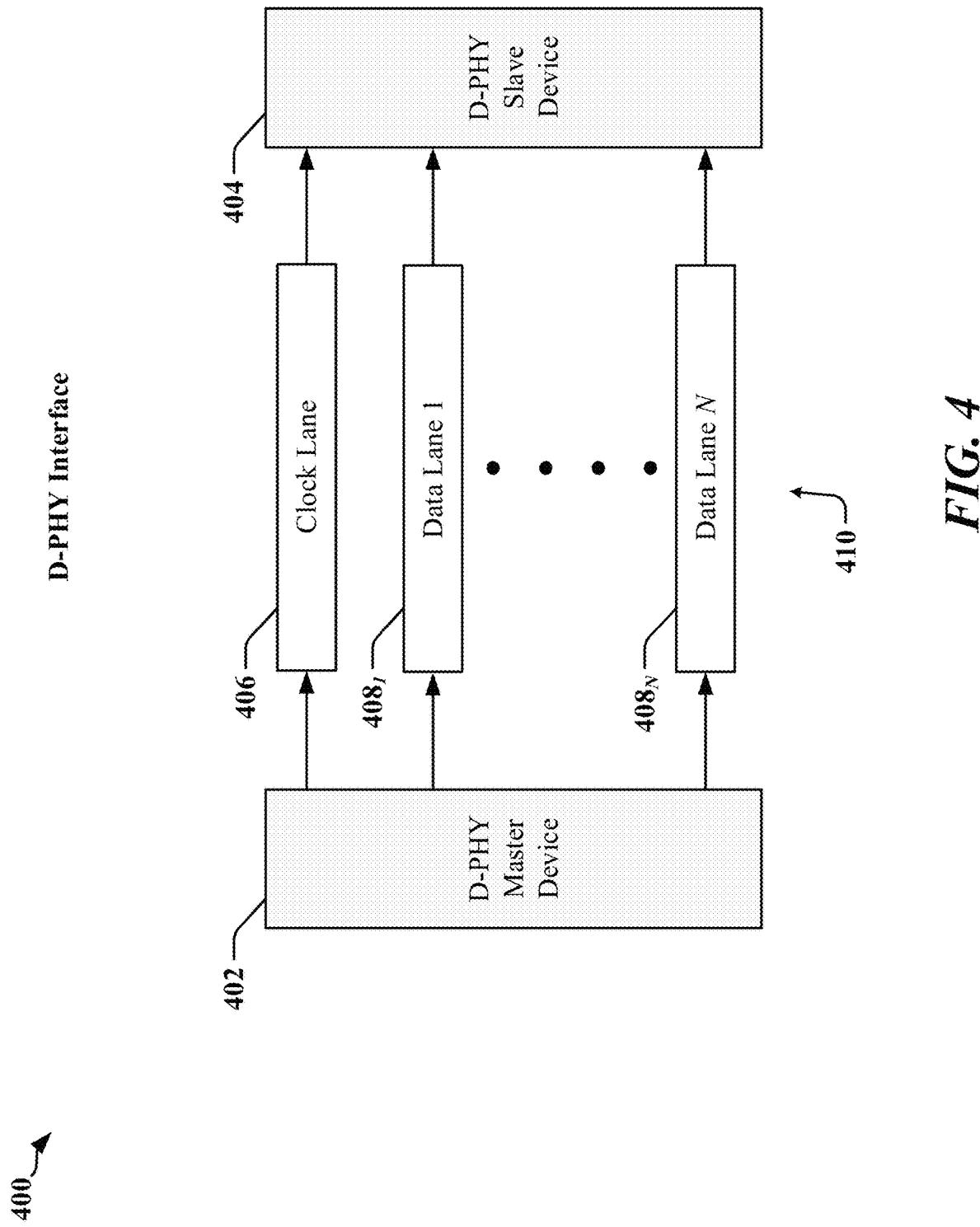
FIG. 4 illustrates an example of signaling lanes that may be employed in a D-PHY interface.

FIG. 4 illustrates a generalized D-PHY configuration 400 that includes a master device 402 and a slave device 404. The master device 402 generates clock signals that control transmissions on the wires 410. A clock signal is transmitted on a clock lane 406 and data is transmitted in one or more data lanes $408_1$-$408_N$. The number of data lanes $408_1$-$408_N$ that are provided or active in a device may be dynamically configured based on application needs, volumes of data to be transferred and power conservation needs.

Figure 5:
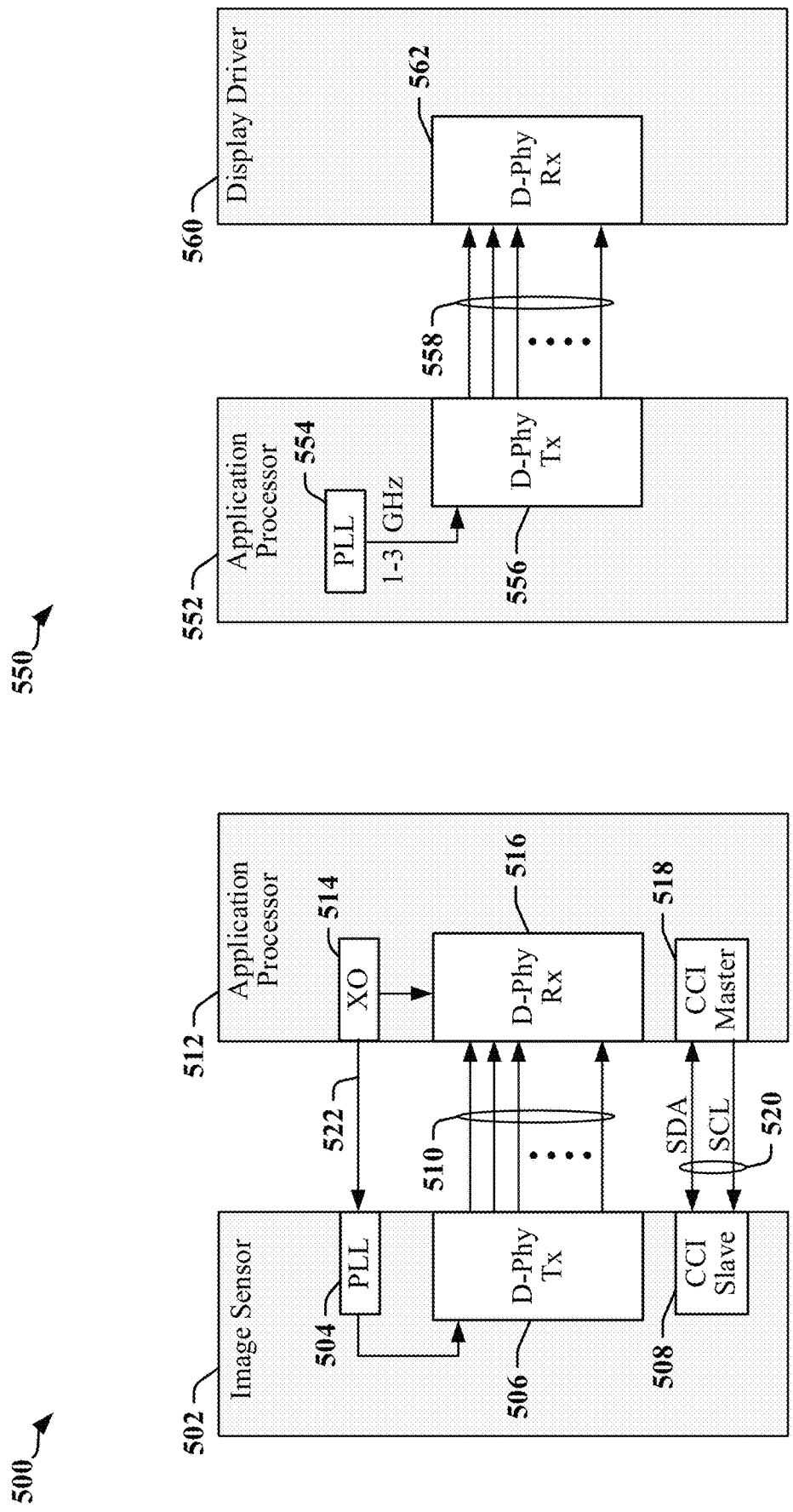
FIG. 5 illustrates examples of apparatus that may be adapted according to certain aspects disclosed herein.

FIG. 5 illustrates certain D-PHY interface configurations for a camera subsystem 500 and for a display subsystem 550. The camera subsystem 500 and/or the display subsystem 550 may be deployed within a mobile communication device, for example. The camera subsystem 500 may include a CSI-2 defined communication link between an image sensor 502 and an application processor 512. The communication link may include a high-data rate data transfer link 510 used by the image sensor 502 to transmit image data to the application processor 512 through a transmitter 506. The high-data rate data transfer link 510 may be configured and operated according to D-PHY protocols. The application processor 512 may include a clock source, such as a crystal oscillator (XO 514), to generate a clock signal 522 that can be used to control the operation of a D-PHY transmitter 506 in the image sensor 502 and the D-PHY receiver 516 in the application processor 512. The clock signal 522 may be received and/or processed by a phase-locked loop (PLL 504) in the image sensor 502. The image sensor 502 and the application processor 512 may be coupled by a CCI bus 520, which may be comparable to the Inter-Integrated Circuit (I2C) interface. The CCI bus 520 may include Serial Clock (SCL) line that carries a clock signal and a Serial Data (SDA) line that carries data. The CCI bus 520 may be bidirectional and may operate at a lower data rate than the high-data rate data transfer link 510. The CCI bus 520 may be used by the application processor 512 to transmit control and data information to the image sensor 502 and to receive control and configuration information from the image sensor 502. The application processor 512 may include a CCI bus master 518 and the image sensor 502 may include a CCI slave 508.

The display subsystem 550 may include a unidirectional data link 558, which may be configured and operated according to D-PHY protocols. In the application processor 552, a clock source such as a PLL 554 may provide a clock signal to a D-PHY transmitter 556 to be used for controlling transmissions on the data link 558. At the display driver 560, a D-PHY receiver 562 may extract embedded clock information from sequences of symbols transmitted on the data link, or from a clock lane provided in the data link 558.

Low-Power and High-Speed Signaling in D-PHY Interfaces

Figure 6:
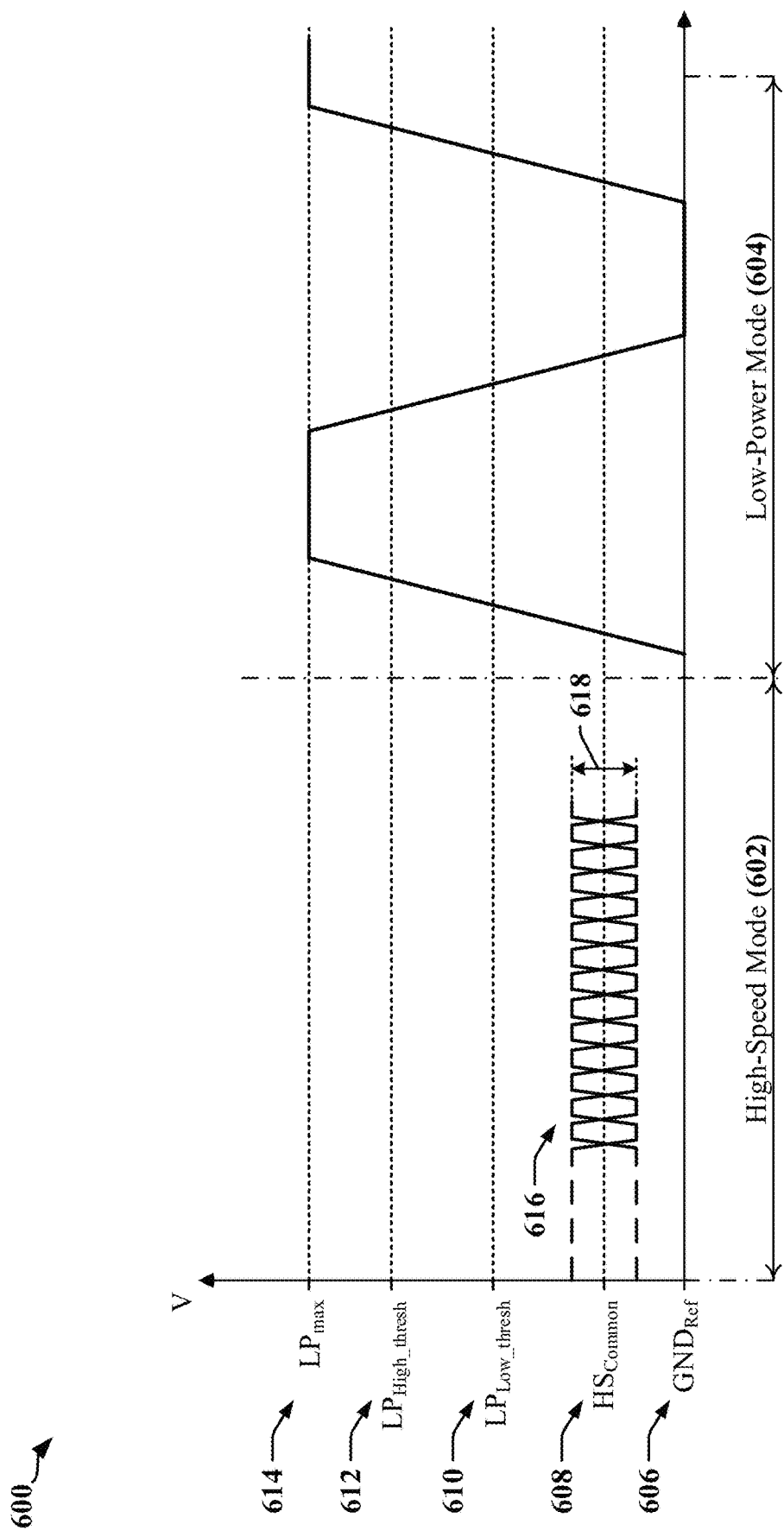
FIG. 6 illustrates high-speed and low-power signaling in a D-PHY interface.

FIG. 6 is a timing diagram 600 illustrating waveforms that correspond to signaling in a D-PHY interface. The D-PHY interface can support a high-speed communication mode and a low-power communication mode, which may be referred to as the HS mode 602 and the LP mode 604, respectively. Data is transmitted at a significantly lower rate in the LP mode 604 than in the HS mode 602. The HS mode 602 and the LP mode 604 operate at different voltage levels and voltage ranges, and may transmit signals using the same wires of a serial bus.

In the HS mode 602, signals are centered on a high-speed common ($HS_{Common}$) voltage level 608, which can be offset from a reference ground voltage level 606. Signals in the HS mode 602 have a voltage range 618 that ensures that high-speed signals 616 do not exceed a logic low threshold voltage level ($LP_{Low\_thresh}$) 610, which defines the upper limit for logic low in the LP mode 604. In one example, the $HS_{Common}$ voltage level 608 may be nominally defined to be 200 millivolts (mV), and the voltage range 618 for high-speed signals may be nominally defined to be 200 mV.

In the LP mode 604, signals switch between a maximum low-power ($LP_{max}$) voltage level 614 and the reference ground voltage level 606. The logic low threshold voltage level $LP_{Low\_thresh}$ 610 and the logic high threshold voltage level ($LP_{High\_thresh}$) 612 define the switching voltage levels for high-to-low transitions and low-to high transitions, respectively. In one example, the maximum low-power ($LP_{max}$) voltage level 614 may be nominally defined at 1.2 Volts (V).

Figure 7:
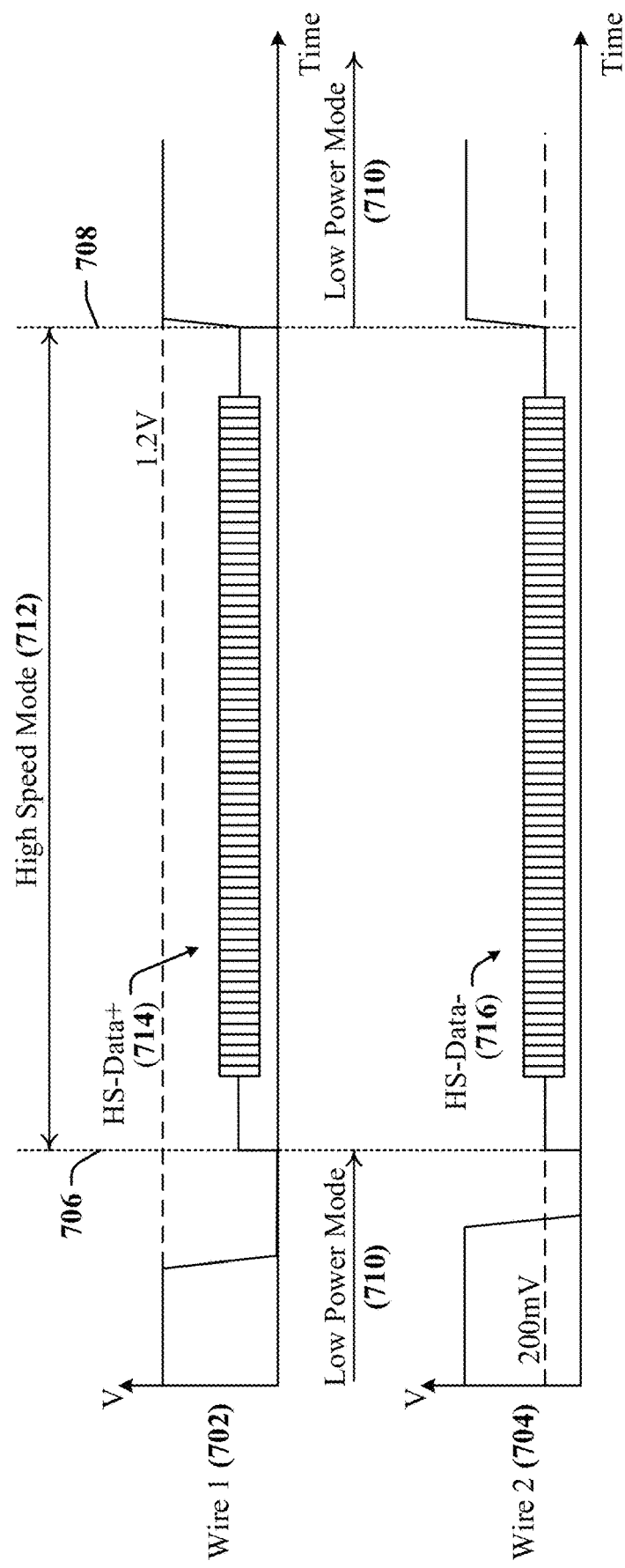
FIG. 7 illustrates transitions between signaling modes in an example of a D-PHY interface.

FIG. 7 illustrates waveforms 700 that include examples of transitions between communication modes in a D-PHY interface. The example relates to two wires of a communication link. The D-PHY interface may be configured to operate in a low-power mode 710 and/or a high-speed mode 712. In the low-power mode 710, a first wire carries data signals at a relatively low data rate and with a voltage level swing of approximately 1.2 volts. The high-speed mode 712 commences at a first point in time 706 and terminates at a second point in time 708. In the high-speed mode 712, the first wire 702 and the second wire 704 carry a low-voltage differential signal 714, 716 that can have a data rate that is orders of magnitude faster than the data rate of the low-power mode 710. For example, the low-power mode 710 may support data rates up to 10 megabits per second (Mbps) while the high-speed mode 712 may support data rates that lie between 80 Mbps and 4.5 gigabits per second (Gbps). The positive version of the differential signal may be carried on the first wire 702, while the negative version is carried on the second wire 704, in the high-speed mode 712. The differential signal may have a relatively low amplitude voltage swing, which in one example may be approximately 200 millivolts (mV). A D-PHY receiver may include use voltage level detectors to enable the receiver to switch between high-speed and low-power modes of operation.

Data Rate Detection in D-PHY Interfaces

The D-PHY interface uses double data rate (DDR) encoding, in which two bits of data are transmitted in one clock cycle. D-PHY specifications provide a broad range of data rates in HS modes of communication. In one example, a D-PHY interface may be configured to communicate data at a data rate ranging from 80 megabits per second to 3 gigabits per second. A receiver is expected to be ready to receive and decode data within a specified time after a HS mode has been initiated.

Figure 8:
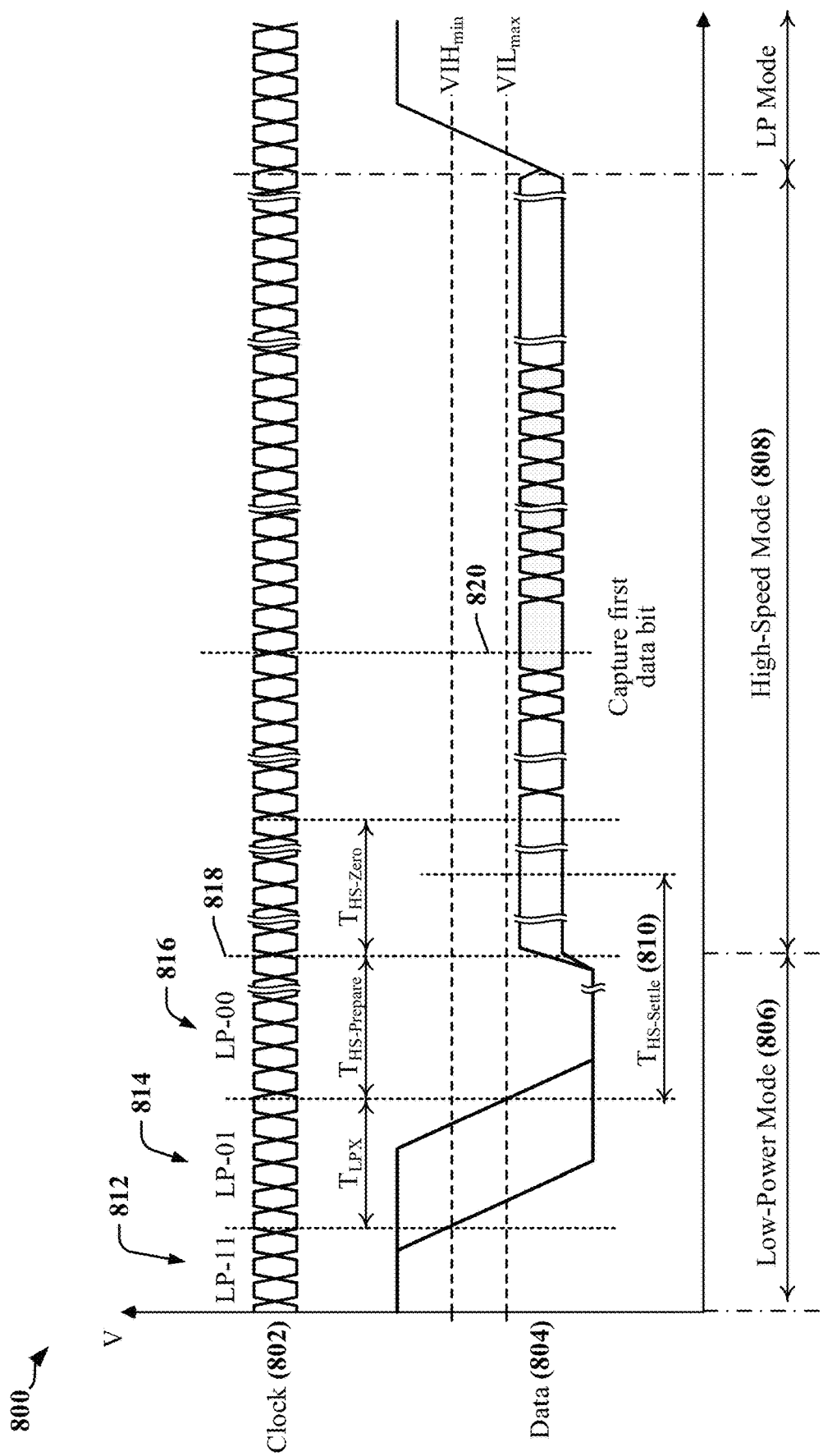
FIG. 8 illustrates settle timing at the commencement of a high-speed mode in a D-PHY interface.

FIG. 8 is a timing diagram 800 that illustrates the commencement of HS mode communication in a D-PHY interface. The timing diagram 800 illustrates timing of signals transmitted on the clock lane 802 and a data lane 804, where the data lane 804 may represent a differential pair in HS mode 808 and/or a single-ended line in LP mode 806. The D-PHY interface is initially configured for LP mode communication. A change from LP mode 806 to HS mode 808 is indicated by the transmission of a sequence of three states in LP mode 806, including the LP-11 state 812, the LP-01 state 814 and the LP-00 state 816. The LP-01 state 814 and the LP-00 state 816 are transmitted after a transition on the clock lane 802 to a high speed clock signal. The HS mode 808 may commence at a point in time 818 after transmission of the sequence of three states.

D-PHY specifications define timing limits and tolerances for a settle period 810 after which a D-PHY receiver is expected to be able to capture data from the signal transmitted on the data lane 804. The receiver can capture data from the data lane 804 after it has enabled its HS line receiver circuits and has aligned its sample clock with the data signal received from the data lane 804 and/or the high speed clock signal transmitted on the clock lane 802. Conventional receivers may use a programmable timer to control timing of the HS settle period 810 and to determine the point in time 820 that the first bit of data can be captured. The use of a programmable timer can be burdensome, since software is required to configure the programmable timer based on the detected received data rate, typically using lookup tables or the like.

Figure 9:
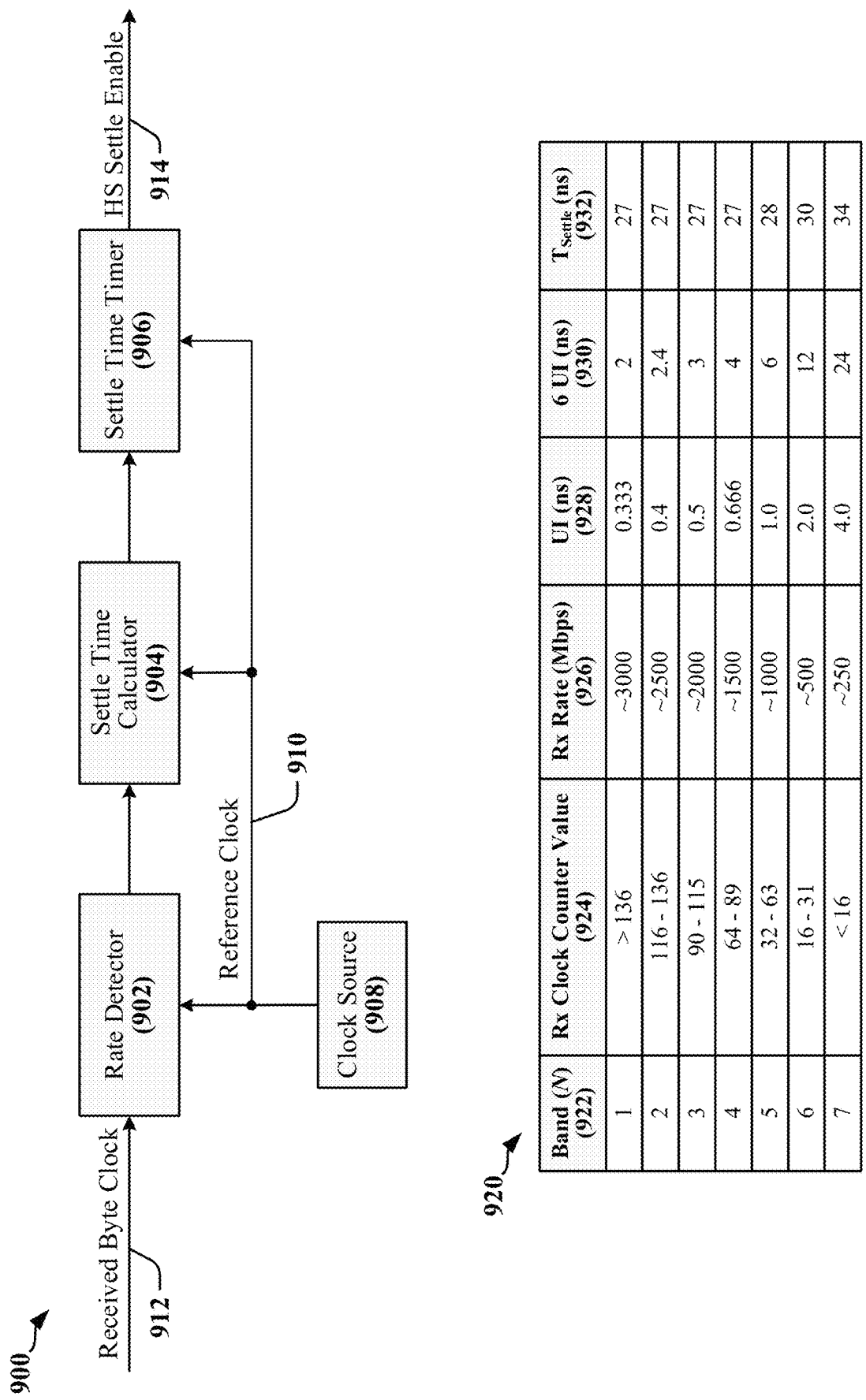
FIG. 9 illustrates automatic data rate detection and settle timing configuration in accordance with certain aspects disclosed herein.

In accordance with certain aspects of this disclosure, a D-PHY receiver may be adapted to detect data rate of a D-PHY transmission. The D-PHY receiver may use the detected data rate to accurately and automatically manage the timing of the settle period 810 when commencing HS modes of communication. FIG. 9 includes a block diagram 900 of a circuit that can automatically detect data rate and automatically configure line receiver circuits 1012 based on calculated settle time. The D-PHY receiver may include a data rate detection circuit 902 and a settle time calculator 904. The calculated settle time may be used to configure a settle time timer 906 that generates a control signal 914 indicating state of the settle period. The data rate detection circuit 902 receives the clock signal from the clock lane 802 and a reference clock signal 910. The reference clock signal 910 may be provided by a local clock source 908. The data rate detection circuit 902 may include combinational logic, flipflops, registers, counters and/or a state machine or other controller to determine the correct timing for enabling the HS receiver.

In one example, the data rate detection circuit 902 includes an N-bit counter that is clocked by the reference clock signal 910. The data rate detection circuit 902 can determine the period of the HS clock signal 912 received from the clock lane 802. The HS clock signal 912 is provided early on the clock lane 802 and before transmissions on the data lane 804, and permits sufficient time to detect data rate and configure the HS receiver. The minimum settle time for a D-PHY interface may be expressed as:

$$T_{Settle} = \left(\frac{85 + 6UI}{T_{R\_Clk}}\right) - A$$

where $T_{Settle}$ is expressed in cycles of the reference clock signal 910, $T_{R\_Clk}$ is the period of the reference clock signal 910 expressed in nanoseconds, A is a constant determined by a delay attributable to the design of the D-PHY receiver circuit, and the 85 ns constant is defined by D-PHY specifications. A unit interval (UI) may be defined as the duration of each bit transmitted on the data lane 804. In one example, $T_{R\_Clk}$=3.2 ns, UI=0.5 ns, 6 UI=3 ns, A=6, and:

$$T_{Settle} = \left(\frac{85 + (6 \times 0.5)}{3.2}\right) - 6 = 21.5 \text{ clock cycles.}$$

In a digital implementation, the minimum settle time may be calculated using the approximation: $T_{Settle}$=(K*88)−6, where K is 5/16 for $T_{R\_Clk}$=3.2 ns, yielding a result of $T_{Settle}$=21.5 clock cycles.

FIG. 9 includes a table 920 that includes examples of settle times calculated and used to automatically configure the HS receiver using certain techniques disclosed herein. The table includes examples of frequency bands 922 defined for the reference clock signal 910. The table includes a range of counter values 924 that can be expected to be automatically configured upon detection of each band, a threshold receive data rate 926 for the band, the corresponding UI 928, and the multiple of 6×UI 930 used in calculating $T_{Settle}$ for the settle period 932.

The N-bit counter in the data rate detection circuit 902, which is clocked by the reference clock signal 910 can be used to define a capture window for the detected data rate. Taking $T_{R\_Clk}$=3.2 ns and N=7 as an example, the window time may be calculated as:

$$T_{Window} = 2^N \times T_{R\_Clk} = 2^7 \times 3.2 \text{ ns} = 128 \times 3.2 \text{ ns} = 409.6 \text{ ns.}$$

Figure 10:
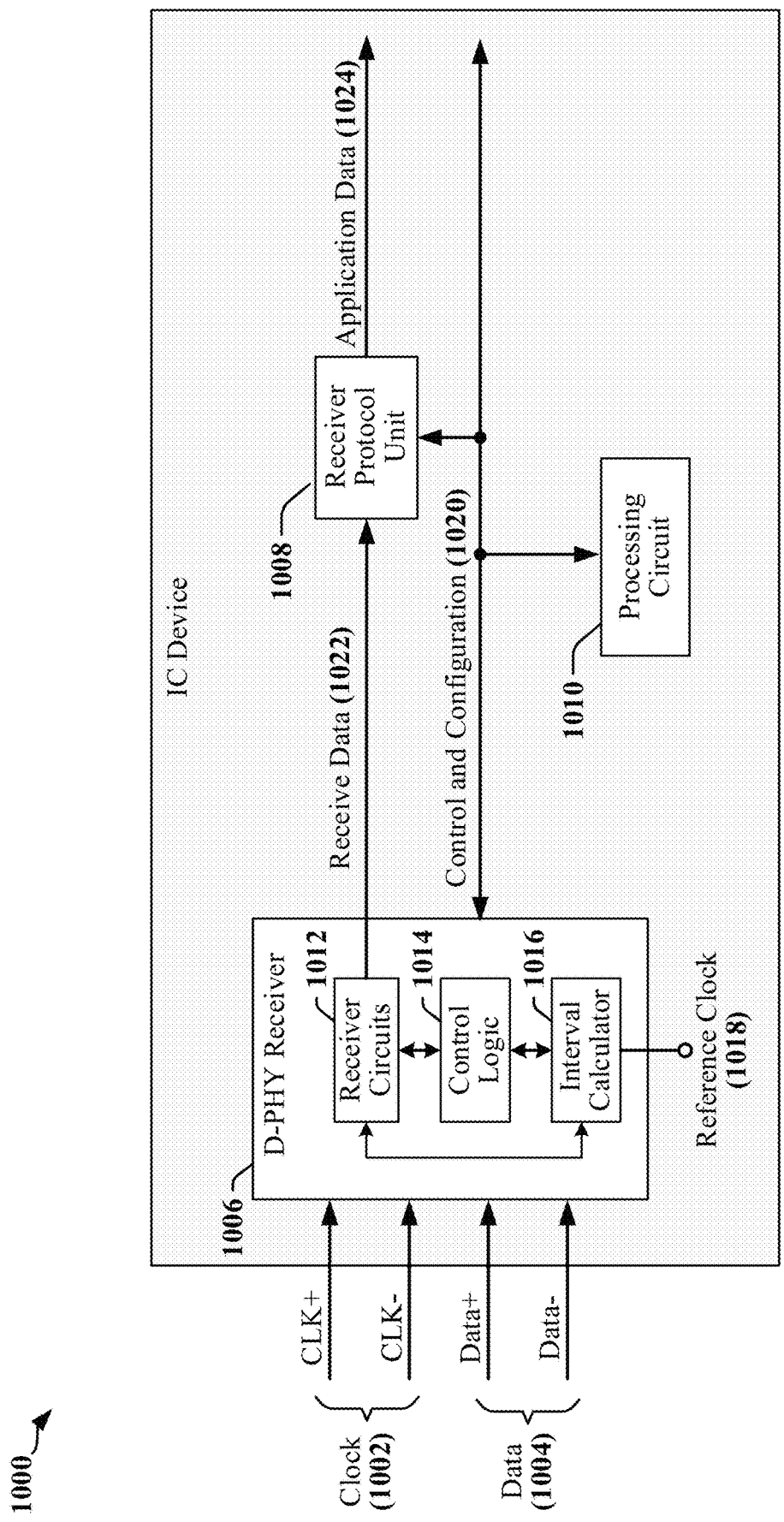
FIG. 10 illustrates an IC device that can receive data from a serial bus operated in accordance with a D-PHY protocol using techniques disclosed herein.

FIG. 10 illustrates an IC device 1000 that can receive data from a serial bus operated in accordance with a D-PHY protocol using certain techniques disclosed herein. A D-PHY receiver 1006 may be configured in accordance with certain aspects disclosed herein and may include a controller 1014 that is responsive to control and configuration signals 1020 provided by the processing circuit 1010 and/or a protocol unit 1008. In some examples, the control and configuration signals 1020 include protocol-related signals, mode control signals, receiver enable signals and other signals. The controller 1014 may report certain information in control and configuration signals 1020 transmitted to the processing circuit 1010 and/or the protocol unit 1008. For instance, the controller 1014 may report synchronization status, communication mode, error detection information, start or end of transmission and other such information.

The D-PHY receiver 1006 may include line receiver circuits 1012 including amplifiers, comparators, latches, registers, buffers and/or combinational logic. The D-PHY receiver 1006 may be configurable for a high-speed mode of communication and may receive differential signals, including a clock signal 1002 and at least one data signal 1004 over differential pairs coupled to the line receiver circuits 1012. The line receiver circuits 1012 may include or cooperate with data capture circuits and may provide a data stream 1022 to a protocol unit 1008. In one example, the data capture circuits may include an edge-triggered flipflop that captures state of the data signal 1004 at a time determined by an edge in a sampling clock. The output of the flipflop may be buffered and transferred to the protocol unit 1008 in the data stream 1022.

The D-PHY receiver 1006 may include data rate detection and/or interval calculation logic circuits 1016 that operate automatically in response to conditions detected in the received clock signal 1002 and/or data signal 1004. The data rate detection and/or interval calculation logic circuits 1016 may receive an internally-generated reference clock 1018 and a signal representative of the bus clock signal 1002. The data rate detection and/or interval calculation logic circuits 1016 may determine data rate expressed as a multiple of the reference clock. For example, the data rate may be expressed as a ratio of cycles of the bus clock signal 1002 to cycles of the reference clock 1018. The data rate detection and/or interval calculation logic circuits 1016 may determine one or more intervals, including an interval corresponding to a settle time defined by D-PHY protocols and/or an interval corresponding to a capture window to be used to generate timing information used to capture data from the data signal 1004. Data rate and interval information may be used to automatically configure high-speed receiver circuits. In one example, data rate and interval information are provided to the line receiver circuits 1012, the controller 1014, the processing circuit 1010 and/or the protocol unit 1008 to support capture and decoding of data.

The protocol unit 1008 may be configured to receive the data stream 1022, which may be organized as a bitstream or as a stream of bytes, words or blocks of data. The protocol unit 1008 may verify or validate the received data and may, for example, produce packets of data to be passed as application data 1024 to one or more applications. The processing circuit 1010 may include a microcontroller, state machine, memory and/or logic that enables the processing circuit 1010 to manage data reception from a D-PHY interface. The processing circuit 1010 may initiate or enable circuits in the D-PHY receiver 1006 and/or the protocol unit 1008 that can detect data rates associated with the clock signal 1002 and/or data signal 1004, automatically calculate settle times and configure line receiver circuits 1012 and/or the protocol unit 1008 to optimally receive and decode data from the data signal 1004.

Additional Descriptions Related to Processing Circuits

Figure 11:
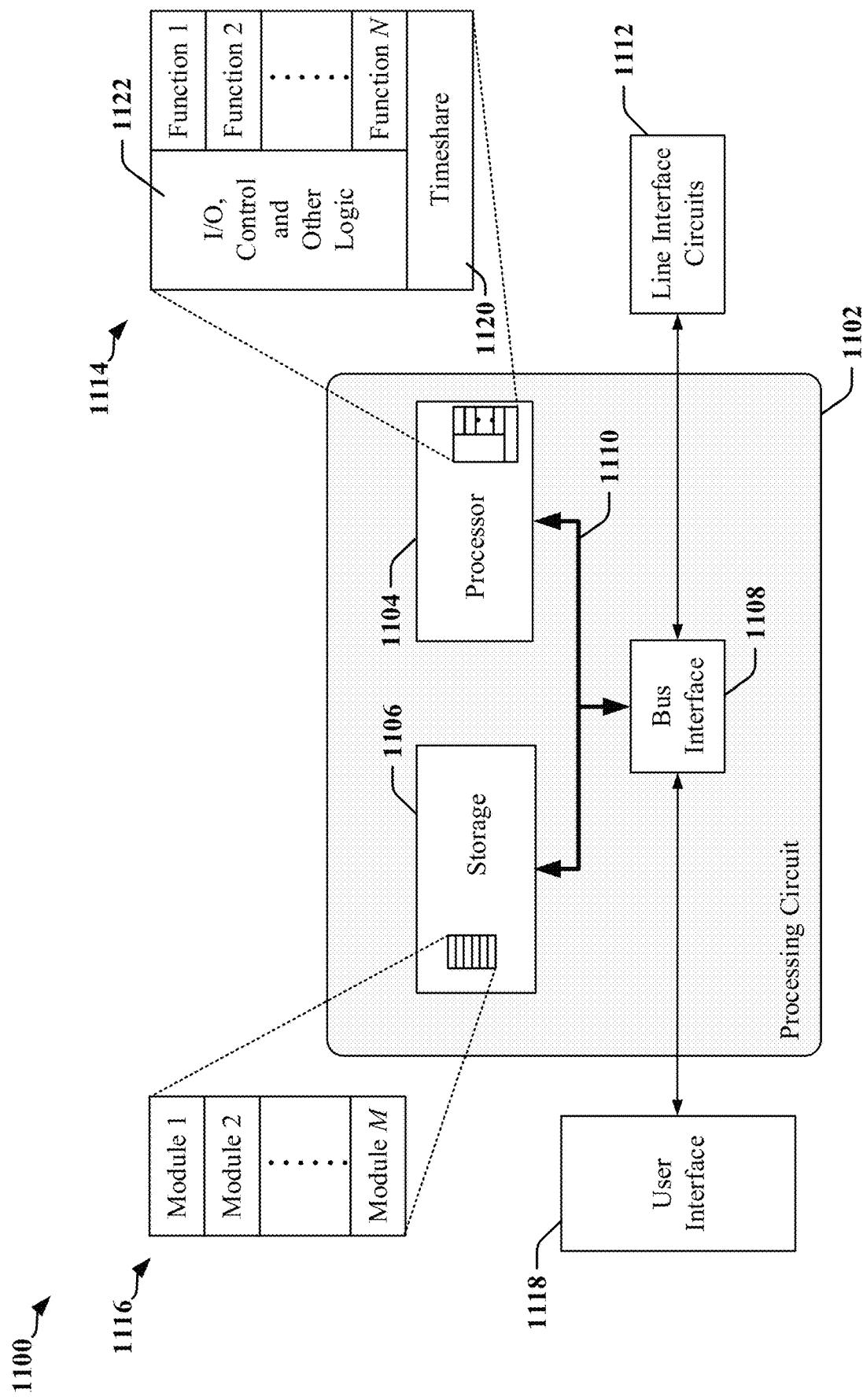
FIG. 11 is a diagram illustrating an example of an apparatus employing a processing circuit that may be adapted according to certain aspects disclosed herein.

FIG. 11 is a conceptual diagram illustrating a simplified example of a hardware implementation for an apparatus 1100 employing a processing circuit 1102 that may be configured to perform one or more functions disclosed herein. In accordance with various aspects of the disclosure, an element, or any portion of an element, or any combination of elements as disclosed herein may be implemented using the processing circuit 1102. The processing circuit 1102 may include one or more processors 1104 that are controlled by some combination of hardware and software modules. Examples of processors 1104 include microprocessors, microcontrollers, digital signal processors (DSPs), ASICs field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage media 1106. Storage media 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more line interface circuits 1112. A line interface circuit 1112 may be provided for each networking technology supported by the processing circuit. In some instances, multiple networking technologies may share some or all of the circuitry or processing modules found in a line interface circuit 1112. Each line interface circuit 1112 provides a means for communicating with various other apparatus over a transmission medium. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage media 1106. In this respect, the processing circuit 1102, including the processor 1104, may be used to implement any of the methods, functions and techniques disclosed herein. The storage media 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage media 1106 or in external computer readable storage medium. The external computer-readable storage medium may include a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium and/or other storage media 1106 may also include, by way of example, a carrier wave, a transmission line, and any other suitable medium for transmitting software and/or instructions that may be accessed and read by a computer. Computer-readable storage medium and/or the storage media 1106 may reside in the processing circuit 1102, in the processor 1104, external to the processing circuit 1102, or be distributed across multiple entities including the processing circuit 1102. The computer-readable storage medium and/or other storage media 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage media 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as the line interface circuit 1112, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to the line interface circuit 1112, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the line interface circuit 1112, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
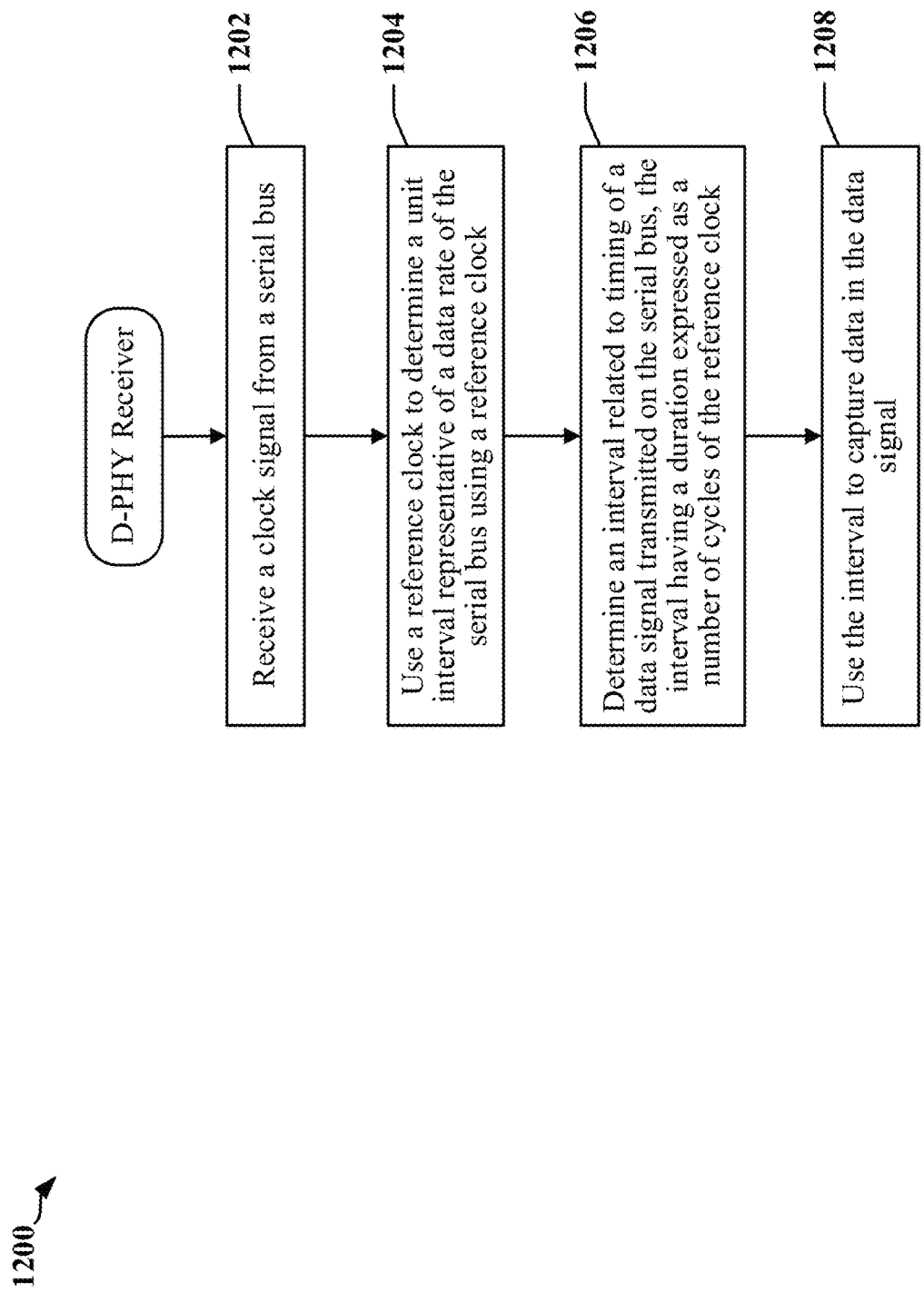
FIG. 12 is a flow chart of a data transfer method operational on one of two devices in an apparatus according to certain aspects disclosed herein.

FIG. 12 is a flow chart 1200 of a method operational on a device configured to be coupled to a D-PHY serial bus. At block 1202, the device may receive a clock signal from a serial bus. At block 1204, the device may use a reference clock to determine a unit interval representative of a data rate of the serial bus. At block 1206, the device may determine an interval related to timing of a data signal transmitted on the serial bus. The interval may have a duration expressed as a number of cycles of the reference clock. At block 1208, the device may use the interval to capture data in the data signal. In some instances, the interval may be calculated as a function of a multiple of the unit interval.

In one example, the interval corresponds to a settle time defined by a D-PHY protocol. In another example, the interval defines a capture window used to capture the data in the data signal. The data may be captured from the data signal when a physical layer interface of the receiving device is configured for a high-speed mode of communication defined by D-PHY protocols.

The clock signal may be a high-speed signal received while the physical layer interface is in a low-speed mode of communication defined by D-PHY protocols and before the physical layer interface enters a high-speed mode of communication defined by the D-PHY protocols.

In certain examples, the device may identify a sequence of signaling states of the serial bus that indicates commencement of a high-speed mode of communication defined by D-PHY protocols. The interval may correspond to a settle period that starts while the sequence of signaling states is being received. A data capture circuit may be enabled before the settle period ends.

Figure 13:
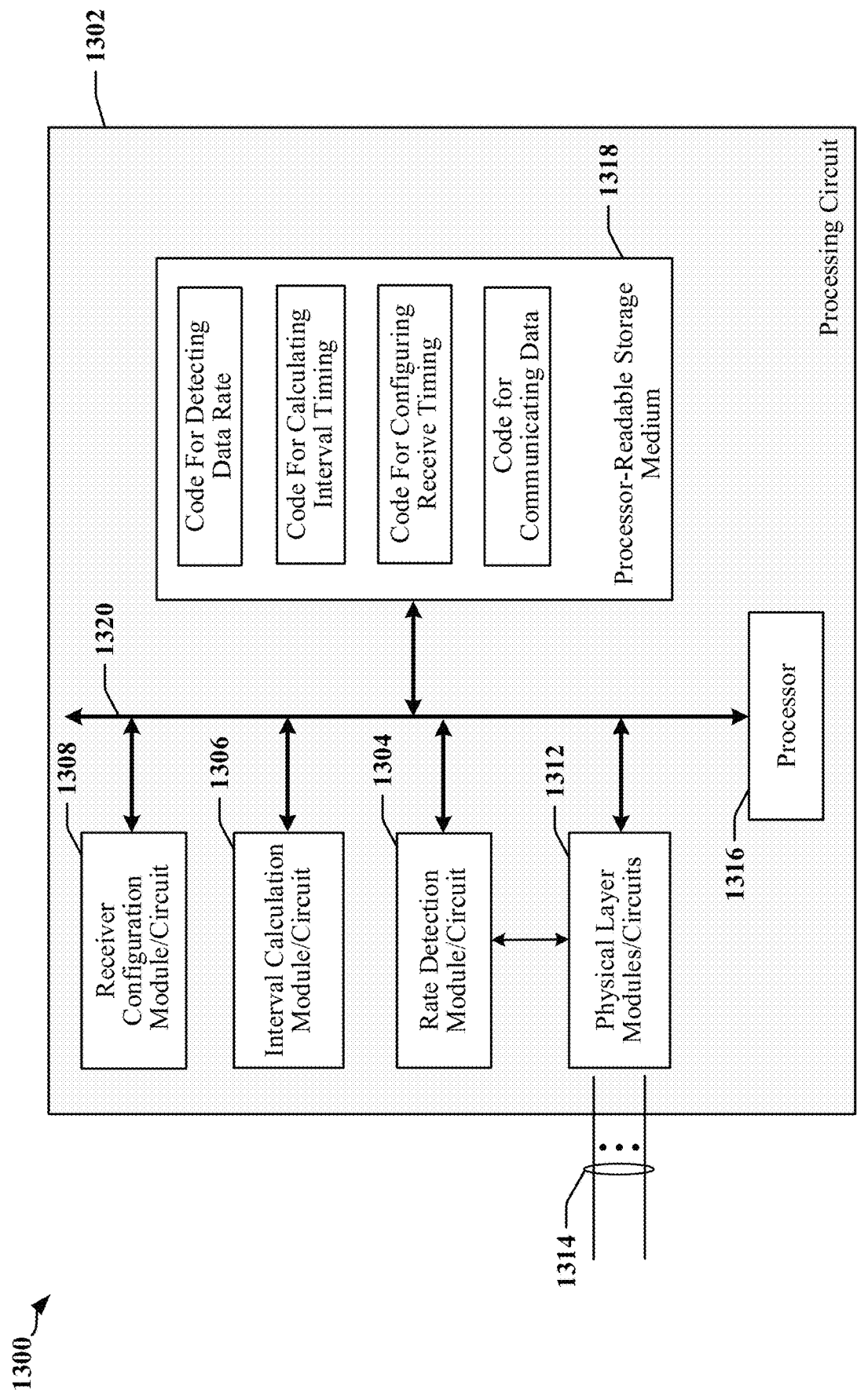
FIG. 13 is a diagram illustrating an example of a hardware implementation for an apparatus employing a processing circuit adapted according to certain aspects disclosed herein.

FIG. 13 is a diagram illustrating a hardware implementation for an apparatus 1300 employing a processing circuit 1302. The processing circuit 1302 typically has a processor 1316 that may be a microprocessor, microcontroller, digital signal processor, a sequencer or a state machine, for example. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the processor 1316, the modules or circuits 1304, 1306, and 1308, the processor-readable storage medium 1318, and physical layer modules and/or circuits 1312 configurable to communicate over connectors or wires of a multi-wire communication link 1314. The bus 1320 may also link various other circuits such as timing sources, peripherals, voltage regulators, and power management circuits.

The processor 1316 is responsible for general processing, including the execution of software stored on the processor-readable storage medium 1318. The software, when executed by the processor 1316, may cause the processing circuit 1302 to perform the various functions described supra for any particular apparatus. The processor-readable storage medium 1318 may also be used for storing data that is manipulated by the processor 1316 when executing software, including data decoded from symbols transmitted over the communication link 1314, which may be configured as data lanes and clock lanes. The processing circuit 1302 further includes at least one of the modules 1304, 1306, and 1308. The modules 1304, 1306, and 1308 may be software modules running in the processor 1316, resident/stored in the processor-readable storage medium 1318, one or more hardware modules coupled to the processor 1316, or some combination thereof. The modules 1304, 1306, and/or 1308 may include microcontroller instructions, state machine configuration parameters, or some combination thereof.

In one configuration, the apparatus 1300 for data communication includes a module and/or circuit 1304 configured to detect data rates associated with the multi-wire communication link 1314, a module and/or circuit 1306 configured to calculate one or more intervals, and a module and/or circuit 1308 that configures the physical layer modules and/or circuits 1312 and/or other components of the apparatus based on the detected data rate and/or the one or more intervals.

In one example, the apparatus 1300 may be configured as a data communication apparatus that has a physical layer interface coupled to a serial bus, a rate detector and interval calculation logic. The rate detector may be configured to receive a clock signal from the serial bus, and use a reference clock to determine a unit interval representative of a data rate of the serial bus. The interval calculation logic may be configured to determine an interval related to timing of a data signal transmitted on the serial bus. The interval may have a duration expressed as a number of cycles of the reference clock. The physical layer interface may be configurable for a high-speed mode of communication and a low-speed mode of communication. The physical layer interface may be configured to use the interval to capture data in the data signal. The interval may be calculated as a function of a multiple of the unit interval.

In some instances, the interval may correspond to a settle time defined by a D-PHY protocol. In some instances, the interval defines a capture window used to capture the data in the data signal. The data may be captured from the data signal when the physical interface circuit is configured for the high-speed mode of communication in accordance with D-PHY protocols.

In some instances, the clock signal received by the rate detector is a high-speed signal received while the physical interface circuit is in the low-speed mode of communication and before the physical interface circuit enters the high-speed mode of communication.

In some implementations, the physical interface circuit is further configured to identify a sequence of signaling states of the serial bus that indicates commencement of the high-speed mode of communication. The interval may correspond to a settle period that starts while the sequence of signaling states is being received. A data capture circuit may be enabled before the settle period ends.

In another example, the processor-readable storage medium 1318 may store, maintain or otherwise include code which, when executed by the processor 1316, causes the processor 1316 to receive a clock signal from a serial bus, use a reference clock to determine a unit interval representative of a data rate of the serial bus using a reference clock, determine an interval related to timing of a data signal transmitted on the serial bus, the interval having a duration expressed as a number of cycles of the reference clock, and use the interval to capture data in the data signal. The interval may be calculated as a function of a multiple of the unit interval.

The interval may define a capture window used to capture the data in the data signal. The data may be captured from the data signal when the physical interface circuit is configured for a high-speed mode of communication defined by D-PHY protocols. The clock signal may be a high-speed signal received while the physical interface circuit is in a low-speed mode of communication defined by D-PHY protocols and before the physical interface circuit enters a high-speed mode of communication defined by the D-PHY protocols.

The processor-readable storage medium 1318 may include code that causes the processor 1316 to identify a sequence of signaling states of the serial bus that indicates commencement of a high-speed mode of communication defined by D-PHY protocols. The interval may correspond to a settle period that starts while the sequence of signaling states is being received. A data capture circuit may be enabled before the settle period ends.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus comprising:
    a physical layer interface coupled to a serial bus;
    a rate detector configured to:
        receive a clock signal from the serial bus; and
        use a reference clock to determine a unit interval representative of a data rate of the serial bus; and
    interval calculation logic configured to determine an interval related to timing of a data signal transmitted on the serial bus, the interval having a duration expressed as a number of cycles of the reference clock,
    wherein the physical layer interface is configured to use the interval to capture data in the data signal, and wherein the reference clock is different from the clock signal.

2. The apparatus of claim 1, wherein the interval corresponds to a settle time defined by a D-PHY protocol.

3. The apparatus of claim 1, wherein the interval defines a capture window used to capture the data in the data signal.

4. The apparatus of claim 1, wherein the data is captured from the data signal when the physical layer interface is configured for a high-speed mode of communication in accordance with D-PHY protocols.

5. The apparatus of claim 1, wherein the clock signal received by the rate detector is a high-speed signal received while the physical layer interface is in a low-speed mode of communication and before the physical layer interface enters a high-speed mode of communication.

6. The apparatus of claim 1, wherein the physical layer interface is further configured to:
    identify a sequence of signaling states of the serial bus that indicates commencement of a high-speed mode of communication.

7. The apparatus of claim 6, wherein the interval corresponds to a settle period that starts while the sequence of signaling states is being received, and wherein a data capture circuit is enabled before the settle period ends.

8. The apparatus of claim 1, wherein the interval is calculated as a function of a multiple of the unit interval.

9. A method performed in a receiving device, comprising:
    receiving a clock signal from a serial bus;
    using a reference clock to determine a unit interval representative of a data rate of the serial bus;
    determining an interval related to timing of a data signal transmitted on the serial bus, the interval having a duration expressed as a number of cycles of the reference clock; and
    using the interval to capture data in the data signal, wherein the reference clock is different from the clock signal.

10. The method of claim 9, wherein the interval corresponds to a settle time defined by a D-PHY protocol.

11. The method of claim 9, wherein the interval defines a capture window used to capture the data in the data signal.

12. The method of claim 9, wherein the data is captured from the data signal when a physical layer interface of the receiving device is configured for a high-speed mode of communication defined by D-PHY protocols.

13. The method of claim 9, wherein the clock signal is a high-speed signal received while a physical layer interface of the receiving device is in a low-speed mode of communication defined by D-PHY protocols and before the physical layer interface enters a high-speed mode of communication defined by the D-PHY protocols.

14. The method of claim 9, further comprising:
    identifying a sequence of signaling states of the serial bus that indicates commencement of a high-speed mode of communication defined by D-PHY protocols.

15. The method of claim 14, wherein the interval corresponds to a settle period that starts while the sequence of signaling states is being received, and wherein a data capture circuit of the receiving device is enabled before the settle period ends.

16. The method of claim 9, wherein the interval is calculated as a function of a multiple of the unit interval.

17. A non-transitory processor readable storage medium comprising code for:
    receiving a clock signal from a serial bus;
    using a reference clock to determine a unit interval representative of a data rate of the serial bus;
    determining an interval related to timing of a data signal transmitted on the serial bus, the interval having a duration expressed as a number of cycles of the reference clock; and
    using the interval to capture data in the data signal, wherein the reference clock is different from the clock signal.

18. The storage medium of claim 17, wherein the interval defines a capture window used to capture the data in the data signal.

19. The storage medium of claim 17, wherein the data is captured from the data signal when a physical layer interface is configured for a high-speed mode of communication defined by D-PHY protocols.

20. The storage medium of claim 17, wherein the clock signal is a high-speed signal received while a physical layer interface is in a low-speed mode of communication defined by D-PHY protocols and before the physical layer interface enters a high-speed mode of communication defined by the D-PHY protocols.

21. The storage medium of claim 17, further comprising code for:
  identifying a sequence of signaling states of the serial bus that indicates commencement of a high-speed mode of communication defined by D-PHY protocols.

22. The storage medium of claim 21, wherein the interval corresponds to a settle period that starts while the sequence of signaling states is being received, and wherein a data capture circuit is enabled before the settle period ends.

23. The storage medium of claim 17, wherein the interval is calculated as a function of a multiple of the unit interval.

24. A data communication apparatus, comprising:
  means for coupling the apparatus to a serial bus;
  means for detecting a data rate of the serial bus, configured to receive a clock signal from the serial bus and use a reference clock to determine a unit interval representative of the data rate; and
  means for calculating an interval related to timing of a data signal transmitted on the serial bus, the interval having a duration expressed as a number of cycles of the reference clock,
  wherein the interval is used to capture data in the data signal, and wherein the reference clock is different from the clock signal.

25. The data communication apparatus of claim 24, wherein the interval defines a capture window used to capture the data in the data signal.

26. The data communication apparatus of claim 24, wherein the data is captured from the data signal when the means for coupling the apparatus to the serial bus is configured for a high-speed mode of communication in accordance with D-PHY protocols.

27. The data communication apparatus of claim 24, wherein the means for coupling the apparatus to the serial bus comprises a physical layer interface, and wherein the clock signal is a high-speed signal received while the physical layer interface is in a low-speed mode of communication and before the physical layer interface enters a high-speed mode of communication.

28. The data communication apparatus of claim 24, wherein the means for coupling the apparatus to the serial bus is configured to:
  identify a sequence of signaling states of the serial bus that indicates commencement of a high-speed mode of communication.

29. The data communication apparatus of claim 28, wherein the interval corresponds to a settle period that starts while the sequence of signaling states is being received, and wherein a data capture circuit is enabled before the settle period ends.

30. The data communication apparatus of claim 24, wherein the interval is calculated as a function of a multiple of the unit interval.

* * * * *